United States Patent
You et al.

(10) Patent No.: US 11,462,745 B2
(45) Date of Patent: Oct. 4, 2022

(54) FUEL CELL CATALYST, FUEL CELL ELECTRODE INCLUDING THE SAME AND MEMBRANE-ELECTRODE ASSEMBLY INCLUDING THE SAME

(71) Applicant: HYUNDAI MOBIS CO., LTD., Seoul (KR)

(72) Inventors: Dae Jong You, Yongin-si (KR); Yong Ho Lim, Yongin-si (KR); Eun Young You, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/114,920

(22) Filed: Dec. 8, 2020

(65) Prior Publication Data
US 2021/0175514 A1 Jun. 10, 2021

(30) Foreign Application Priority Data
Dec. 10, 2019 (KR) .......................... 10-2019-0163738

(51) Int. Cl.
*H01M 4/88* (2006.01)
*H01M 4/90* (2006.01)
*H01M 4/92* (2006.01)
*H01M 8/1004* (2016.01)

(52) U.S. Cl.
CPC ....... *H01M 4/8882* (2013.01); *H01M 4/9016* (2013.01); *H01M 4/926* (2013.01); *H01M 8/1004* (2013.01)

(58) Field of Classification Search
CPC ................................................... H01M 4/8882
See application file for complete search history.

(56) References Cited

U.S. PATENT DOCUMENTS

| | | | | |
|---|---|---|---|---|
| 2003/0102099 | A1* | 6/2003 | Yadav | H01M 8/1246 162/208 |
| 2004/0121211 | A1* | 6/2004 | Asano | H01M 8/1027 429/493 |
| 2009/0214927 | A1* | 8/2009 | Dadheech | H01M 8/0206 429/434 |
| 2013/0216934 | A1* | 8/2013 | Park | H01M 4/926 429/482 |
| 2015/0349351 | A1 | 12/2015 | Dadheech et al. | |

(Continued)

FOREIGN PATENT DOCUMENTS

KR    10-1467061 B1    12/2014

OTHER PUBLICATIONS

Office Action of Korean Patent Application No. 10-2019-0163738—5 pages (dated Dec. 4, 2020).

(Continued)

*Primary Examiner* — Brian R Ohara
(74) *Attorney, Agent, or Firm* — Morgan, Lewis & Bockius LLP (57) ABSTRACT

The present disclosure relates to a fuel cell catalyst, a fuel cell electrode including the same, and a membrane-electrode assembly including the same. In one embodiment, the fuel cell catalyst includes: a support including a titanium oxynitride represented by the following Formula 1: $TiO_{1-y}N_y$, wherein $0.05<y<0.9$; and an active material supported on the support.

13 Claims, 4 Drawing Sheets

(56) References Cited

U.S. PATENT DOCUMENTS

2018/0331368 A1* 11/2018 Kongkanand ....... H01M 8/1039

OTHER PUBLICATIONS

Wang et al., "The oxygen reduction reaction on Pt/TiOxNy-based electrocatalyst for PEM fuel cell applications", J Appl Electrochem, vol. 42—10 pages (Aug. 8, 2012).

Higgins et al., "Titanium nitride-carbon nanotube core-shell composites as effective electrocatalyst supports for low temperature fuel cells", Journal of Material Chemistry, vol. 22—6 pages (2012).

* cited by examiner

(a) Example (b) Comparative Example 1

(c) Comparative Example 2

(d) Comparative Example 3

FIG. 4

FUEL CELL CATALYST, FUEL CELL ELECTRODE INCLUDING THE SAME AND MEMBRANE-ELECTRODE ASSEMBLY INCLUDING THE SAME

CROSS-REFERENCE TO RELATED APPLICATION

This application claims priority from and the benefit of Korean Patent Application No. 10-2019-0163738, filed on Dec. 10, 2019, which is hereby incorporated by reference for all purposes as if set forth herein.

BACKGROUND

Field

Exemplary embodiments of the present disclosure relate to a fuel cell catalyst, a fuel cell electrode including the same, and a membrane-electrode assembly including the same. More specifically, a fuel cell catalyst having excellent activity and high-potential durability, a fuel cell electrode including the same, and a membrane-electrode assembly including the same.

Discussion of the Background

A fuel cell is a device that generates electricity by converting chemical energy into electrical energy by oxidation of the fuel hydrogen. The fuel cell may use hydrogen produced using renewable energy, produces water as a reaction product, and is attracting attention as an environmentally friendly energy source since it produces no air pollutants or greenhouse gases. The fuel cell is divided, according to the kinds of electrolyte and fuel used, into a proton exchange membrane fuel cell (PEMFC), a direct methanol fuel cell (DMFC), a phosphoric acid fuel cell (PAFC), a molten carbonate fuel cell (MCFC) and a solid oxide fuel cell (SOFC).

Among them, the proton exchange membrane fuel cell has a relatively low operating temperature, a high energy density, fast start-up characteristics and excellent response characteristics, and thus studies on technology for the use thereof as an energy source for automobiles, various electronic devices, transportation and power generation have been actively conducted.

In the fuel cell, hydrogen is supplied to the anode, and oxygen is supplied to the cathode. The catalyst of the anode oxidizes the hydrogen to form protons, and the protons pass through a proton conductive membrane and are reduced with oxygen by the catalyst of the cathode to produce electricity.

Figure 1:
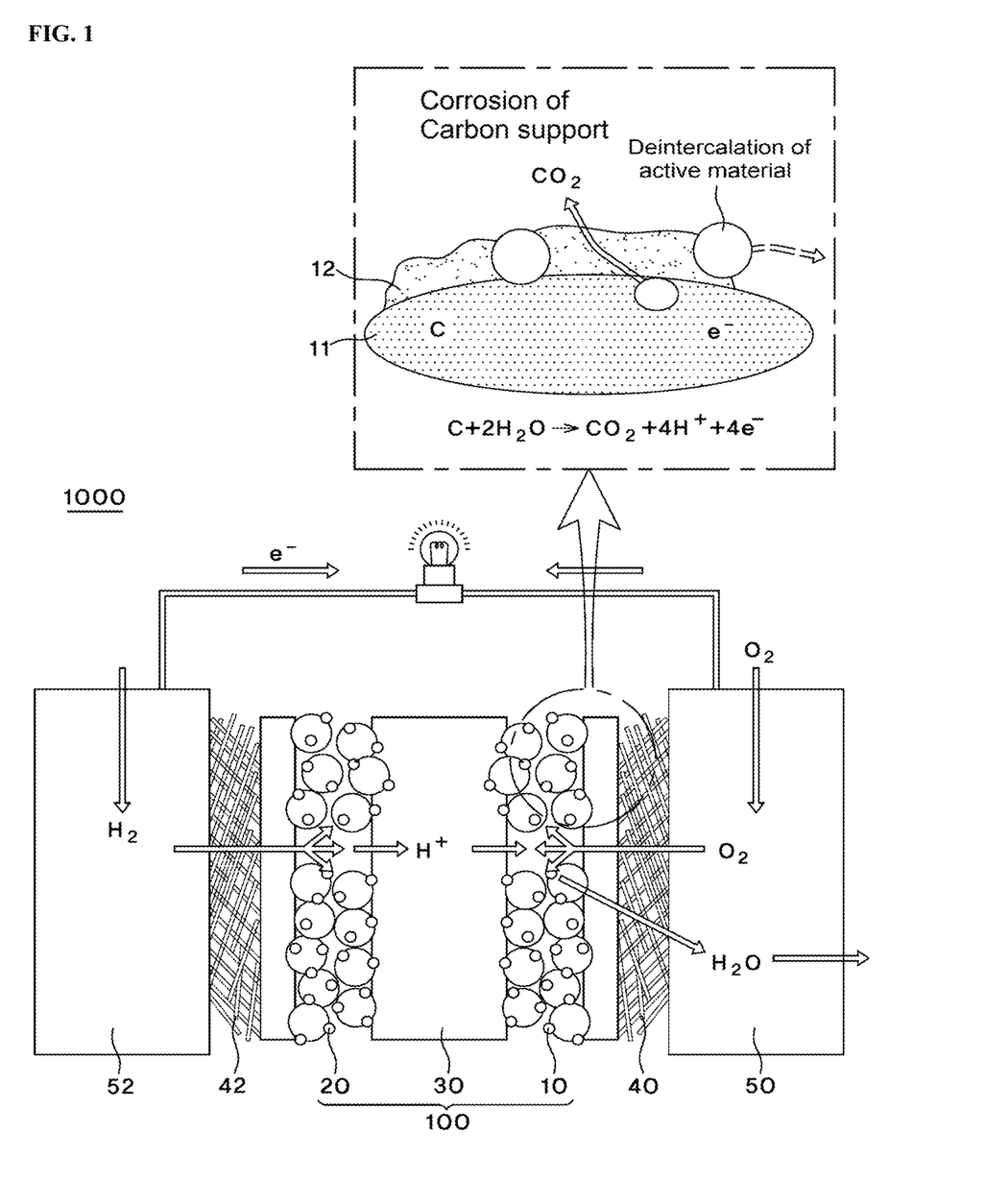
FIG. 1 schematically shows a catalytic oxidation process that occurs in the cathode of a conventional fuel cell.

FIG. 1 schematically shows a catalytic oxidation process that occurs in a cathode of a conventional fuel cell. Referring to FIG. 1, a fuel cell 1000 include a membrane-electrode assembly (MEA) 100 including a cathode 10, an anode 20, and an electrolyte membrane 30 interposed between the cathode 10 and the anode 20, in which the anode and the cathode each includes a catalyst including an active material and a support that supports the active material. In addition, gas diffusion layers (GDLs) 40 and 42 and separators 50 and 52 may be sequentially formed on both sides of the membrane-electrode assembly 100, respectively.

Referring to FIG. 1, hydrogen supplied to a fuel cell anode (hydrogen electrode) is separated into hydrogen ions and electrons ($H_2 \rightarrow 2H^+ + 2e^-$, $E_0 = 0.0$ V), and air is supplied to a fuel cell cathode (air electrode) and separated into oxygen ions and electrons ($\frac{1}{2}O_2 + 2H^+ + 2e^- \rightarrow H_2O$, $E_0 = 1.23$ V). Electricity is generated by movement of the separated electrons, and the hydrogen and the oxygen come into contact with each other to generate heat while producing water ($H_2O$) (overall reaction=$\frac{1}{2}O_2 + H^+ \rightarrow H_2O$, $E_0 = 1.23$ V). Meanwhile, a catalyst is used to increase the reaction efficiency of the fuel cell. As the conventional fuel cell anode (hydrogen electrode) catalyst, platinum (Pt) having excellent oxygen reduction reaction characteristics is used, and as a support for supporting the catalyst, a carbon (C) support having a large specific surface area (500 m²/g or more) and excellent electrical conductivity (less than 25 S/cm) is used.

Meanwhile, for a fuel cell that is used in a vehicle, the oxidation potential of the cathode rises by 1.2 V or more during the turning on/off of the vehicle power source. At this time, as shown in FIG. 1, a phenomenon occurs in which oxidation of a carbon support 11 of the cathode occurs ($C + 2H_2O \rightarrow CO_2 + 4H^+ + 4e^-$) and deintercalation and agglomeration of an active material 12 occurs, thus degrading the performance of the catalyst. In addition, as the carbon support is oxidized, problems arise in that the thickness of each of the catalyst layer and the membrane-electrode assembly decreases and the performance of the electrode deteriorates.

The background art related to the present disclosure is disclosed in Korean Patent No. 10-1467061 (published on Dec. 2, 2014; entitled "Method for Manufacturing Cubic Pt/C Catalyst, Cubic Pt/C Catalyst Manufactured Thereby and Fuel Cell Using the Same").

SUMMARY

An object of the present disclosure is to provide a support for a fuel cell having excellent corrosion resistance and electrical conductivity.

Another object of the present disclosure is to provide a fuel cell catalyst having excellent high-potential stability.

Still another object of the present disclosure is to provide a fuel cell catalyst having excellent oxygen evolution reaction activity.

Yet another object of the present disclosure is to provide a fuel cell catalyst having excellent productivity and economic efficiency.

Still yet another object of the present disclosure is to provide an electrode including the fuel cell catalyst.

A further object of the present disclosure is to provide a membrane-electrode assembly including the fuel cell catalyst.

Another further object of the present disclosure is to provide a fuel cell including the fuel cell catalyst.

One aspect of the present disclosure is directed to a fuel cell catalyst. In one embodiment, the fuel cell catalyst includes: a support including a titanium oxynitride represented by the following Formula 1; and an active material supported on the support:

[Formula 1]

wherein $0.05 < y < 0.9$.

In one embodiment, the titanium oxynitride of Formula 1 may be included in an amount of 2.4 to 20 wt % based on the total weight of the support.

In one embodiment, the fuel cell catalyst may include 100 parts by weight of the support and 10 to 60 parts by weight of the active material.

In one embodiment, the active material may have an average size of 2 to 10 nm.

In one embodiment, the support may have a BET specific surface area of 20 to 50 m²/g and an electrical conductivity of 20 to 40 S/cm.

In one embodiment, the support may have an average pore size of 50 to 80 nm.

In one embodiment, the support may be prepared by a method including steps of: preparing an intermediate by heat-treating titanium dioxide (TiO$_2$) to a temperature of 400 to 900° C. while introducing a nitrogen-containing gas thereto; and cooling the intermediate.

In one embodiment, the heat-treating may be performed by heating to a temperature of 400 to 900° C. at a heating rate of 1 to 15° C./second.

In one embodiment, the active material may include one or more precious metals selected from among platinum (Pt), palladium (Pd), iridium (Ir) and ruthenium (Ru).

In one embodiment, the active material may further include one or more transition metals selected from among copper (Cu), cobalt (Co), nickel (Ni) and iron (Fe).

Another aspect of the present disclosure is directed to a fuel cell electrode including the fuel cell catalyst.

Still another aspect of the present disclosure is directed to a membrane-electrode assembly for a fuel cell including the fuel cell catalyst. In one embodiment, the membrane-electrode assembly includes: a cathode; an anode; and an electrolyte membrane interposed between the cathode and the anode, wherein one or more of the cathode and the anode include the fuel cell catalyst.

Yet another aspect of the present disclosure is directed to a fuel cell including the fuel cell catalyst.

The fuel cell catalyst according to the present disclosure may have excellent oxygen reduction reaction activity and high-potential durability, because the support itself has excellent corrosion resistance and electrical conductivity and the bonding strength between the support and the metal catalyst is excellent. When the catalyst is used as a fuel cell catalyst, the amount of expensive active material used may be minimized, and thus the fuel cell catalyst may have excellent productivity and economic efficiency.

DETAILED DESCRIPTION OF THE ILLUSTRATED EMBODIMENTS

In the following description, the detailed description of related publicly-known technology or configuration will be omitted when it may unnecessarily obscure the subject matter of the present disclosure.

In addition, the terms used in the following description are terms defined by taking into consideration the functions obtained in accordance with embodiments of the present disclosure, and may be changed in accordance with the option of a user or operator or a usual practice. Accordingly, the definition of the terms should be made based on the contents throughout the present specification.

Fuel Cell Catalyst

One aspect of the present disclosure is directed to a fuel cell catalyst. In one embodiment, the fuel cell catalyst includes: a support including a titanium oxynitride; and an active material supported on the support.

In one embodiment, the support includes a titanium oxynitride represented by the following Formula 1:

$$TiO_{1-y}N_y \qquad \text{[Formula 1]}$$

wherein 0.05<y<0.9.

When the support includes the titanium oxynitride of Formula 1, it may have excellent electrical conductivity, and when an active material including platinum is supported on the support, the active material and the support may strongly interact with each other (that is, strong metal-support interaction (SMSI)), and thus the performance of the catalyst may be improved.

When y in the titanium oxynitride of Formula 1 is 0.05 or less, a material phase having reduced electrochemical and chemical stabilities may be prepared, which may degrade the performance and stability of the support, and when y in Formula 1 is 0.9 or more, the mechanical properties and structural stability of the support according to the present disclosure may deteriorate. For example, y in Formula 1 may be 0.2 to 0.4. For example, y may be 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8 or 0.85.

In one embodiment, the support may be prepared by a method including steps of: (S10) preparing an intermediate by heat-treating titanium dioxide (TiO$_2$) to a temperature of 400 to 900° C. while introducing a nitrogen-containing gas thereto; and (S20) cooling the intermediate.

For example, the support may be prepared by a method including steps of: (S10) preparing an intermediate by heat-treating titanium dioxide (TiO$_2$) to a temperature of 400 to 900° C. while introducing a nitrogen-containing gas thereto; and (S20) introducing argon (Ar) gas to remove unreacted compound from the intermediate, and then cooling the intermediate.

A Ti—O—N bond is formed by a reaction between titanium dioxide and a nitrogen-containing gas during the preparation of the support. When the heat-treatment temperature range specified in the present disclosure is applied, nitride may be produced only on the surface of the support, and the production of a compound with a Ti—O—N bond may increase as the reaction temperature increases. Thus, when the conditions for preparing the support according to the present disclosure are applied, the production of the Ti—O—N bond having excellent electrical conductivity and durability may increase, so that the performance of the fuel cell may be greatly improved. On the other hand, if the reaction temperature is higher than 900° C., a compound with a TiN bond may be produced, which may be unsuitable as a fuel cell support.

For example, the intermediate may be prepared by introducing titanium dioxide (TiO$_2$) into a container such as a furnace, and heating the titanium dioxide (TiO$_2$) while introducing a nitrogen-containing gas into the container.

In one embodiment, the heat-treating may be performed by heating to and maintenance at 400 to 900° C. When the heat-treating is performed under these conditions, the nitrogen component of the nitrogen-containing gas may sufficiently penetrate the titanium dioxide and easily substituted with the oxygen of the titanium dioxide, thus easily forming the titanium oxynitride. When the heat-treating is performed at a temperature higher than 900° C., a compound with a TiN bond may be produced, which may be unsuitable as a fuel cell support. For example, the heating may be performed at a rate of 1 to 15° C./min. Under this condition, the nitrogen may easily substituted with the oxygen of the titanium dioxide. For example, the heating may be performed at a rate of 1 to 10° C./min.

In one embodiment, the elevated temperature may be maintained for 1 to 10 hours. Under this condition, the nitrogen may easily substituted with the oxygen of the titanium dioxide. For example, the elevated temperature may be maintained for 1 to 5 hours.

The nitrogen-containing gas may include one or more of ammonia ($NH_3$) and nitrogen ($N_2$). In one embodiment, the nitrogen-containing gas may be introduced into the container at a flow rate of 0.001 to 10 L/min. Under this condition, nitrogen may sufficiently penetrate the titanium dioxide and easily substituted with the oxygen of the titanium dioxide, thus easily forming the titanium oxynitride. For example, the nitrogen-containing gas may be introduced at a flow rate of 2 to 10 ml/min. For another example, the nitrogen-containing gas may be introduced at a flow rate of 2 to 5 ml/min.

In one embodiment, the cooling may be performed up to room temperature.

In one embodiment, the titanium oxynitride of Formula 1 may be included in an amount of 2.4 to 20 wt % based on the total weight of the support. Under this condition, the catalyst may have excellent electrical conductivity and corrosion resistance. For example, the titanium oxynitride may be included in an amount of 0.8 to 12 wt %. For example, it may be included in an amount of 2.4, 2.5, 2.6, 2.7, 2.8, 2.9, 3, 3.5, 4, 4.5, 5, 5.5, 6, 6.5, 7, 7.5, 8, 8.5, 9, 9.5, 10, 11, 12, 13, 14, 15, 16, 17, 18, 19 or 20 wt %.

In one embodiment, the support may have a BET specific surface area of 20 to 50 $m^2/g$ and an electrical conductivity of 20 to 40 S/cm. Under this condition, the catalyst may have excellent electrical conductivity and corrosion resistance.

For example, when the catalyst includes platinum (Pt) as the active material, it may have an electrochemical surface area (ECSA) of 35 to 50 $m^2/g$. For example, the catalyst includes platinum (Pt) as the active material, it may have the ESCA of 35, 36, 37, 38, 39, 40, 41, 42, 43, 44, 45, 46, 47, 48, 49 or 50 $m^2/g$.

In one embodiment, the support may have an average pore size of 50 to 80 nm. Under this condition, the support may easily pass water or oxygen gas therethrough while having excellent mechanical properties. In addition, the catalyst may have excellent electrical conductivity and corrosion resistance.

In one embodiment, the fuel cell catalyst may include 100 parts by weight of the support and 10 to 60 parts by weight of the active material. When the support and the active material are included in amounts within the above ranges, the active material may be stably supported on the support, so that the catalyst may have excellent high-potential stability. In addition, in this case, the amount of expensive active material used may be minimized, and thus the fuel cell catalyst may have excellent economic efficiency. For example, the fuel cell catalyst may include 100 parts by weight of the support and 15 to 30 parts by weight of the active material.

In one embodiment, the active material may be included in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 parts by weight, based on 100 parts by weight of the support.

In one embodiment, the active material may include one or more precious metals selected from among platinum (Pt), palladium (Pd), iridium (Ir) and ruthenium (Ru). When the active material includes the precious metal(s), the catalyst may have excellent electrical conductivity. For example, the active material may include platinum.

In one embodiment, the active material may further include one or more transition metals selected from among copper (Cu), cobalt (Co), nickel (Ni) and iron (Fe). For example, the active material may include an alloy of the above-described precious metal and the above-described transition metal.

Under the above-described conditions, the active material may have an average size of 2 to 10 nm. The size may mean the maximum length of the active material. When the active material has an average size within the above range, the active material may be stably supported on the support and may have excellent electrical conductivity.

Electrode Including Fuel Cell Catalyst

Another aspect of the present disclosure is directed to a fuel cell electrode including the fuel cell catalyst.

Membrane-Electrode Assembly Including Fuel Cell Catalyst

Still another aspect of the present disclosure is directed to a membrane-electrode assembly including the fuel cell catalyst. In one embodiment, the membrane-electrode assembly includes: a cathode; an anode; and an electrolyte membrane interposed between the cathode and the anode, wherein one or more of the cathode and the anode include the fuel cell catalyst. For example, the cathode may include the fuel cell catalyst.

The electrolyte membrane may be included for the diffusion of a reaction product and ions, and may include a conventional one. For example, the electrolyte membrane may include one or more of a sulfonated hydrocarbon-based polymer, a perfluorinated polymer, a benzimidazole-based polymer, a polyimide-based polymer, a polyetherimide-based polymer, a polyetherketone-based polymer, a polyether-etherketone-based polymer, and a polyphenylquinoxaline-based polymer. In one embodiment, the sulfonated hydrocarbon-based polymer may include one or more of polyarylene ether sulfone (S-PES), sulfonated polybenzimidazole (S-PBI), sulfonated polyether ketone (S-PEEK), poly (para)phenylene (S-PP), sulfonated polyimide (S-PI), and sulfonated polysulfone (S-PS). In one embodiment, the perfluorinated polymer may include one or more of Nafion (DuPont), Flemion (Asahi Glass), Asiplex (Asahi Chemical), Dow XUS (Dow Chemical), and Aquivion (Solvay).

Fuel Cell Including Fuel Cell Catalyst

Yet another aspect of the present disclosure is directed to a fuel cell including the fuel cell catalyst. The fuel cell may include the membrane-electrode assembly. In one embodiment, a gas diffusion layer and a separator may be sequentially disposed on each of both sides of the cathode and anode of the membrane-electrode assembly.

Hereinafter, the configuration and effects of the present disclosure will be described in more detail with reference to preferred examples. However, these examples are presented as preferred examples of the present disclosure and may not be construed as limiting the scope of the present disclosure in any way. The contents that are not described herein can be sufficiently and technically envisioned by those skilled in the art, and thus the description thereof will be omitted herein.

Example and Comparative Examples

Example (1) Preparation of support: Titanium dioxide ($TiO_2$) was introduced into a furnace, and heat treatment was performed by heating the furnace to 550° C. at a heating rate of 10° C./min and maintaining that temperature for 5 hours, while introducing a nitrogen-containing gas (containing $NH_3$) into the furnace at a flow rate of 2 to 10 cc/min, thereby preparing an intermediate. Thereafter, the gas was replaced with argon, and then the intermediate was naturally cooled to room temperature, thereby preparing a support. The support included 5.5 wt % of a titanium oxynitride having a structure represented by the following Formula 1:

[Formula 1]

$$TiO_{1-y}N_y$$

wherein y=0.25.

(2) Preparation of Catalyst: platinum (Pt) having an average size of 2 to 10 mm was supported on the prepared support according to a known method, thereby preparing a catalyst including 20 parts by weight of platinum (Pt) based on 100 parts by weight of the support.

Comparative Example 1

As a fuel cell catalyst, a conventional Pt/C catalyst (including 19.7 wt % of Pt) (TEC10EA20E, TKK Co., Ltd.) was used.

Comparative Example 2

A fuel cell catalyst was prepared in the same manner as Example 1, except that a support including 2.1 wt % of the titanium oxynitride having the structure of Formula 1 ($TiO_{1-y}N_y$, where y=0.11) was applied.

Comparative Example 3

A fuel cell catalyst was prepared in the same manner as Example 1, except that a support including 22 wt % of the titanium oxynitride having the structure of Formula 1 ($TiO_{1-y}N_y$, where y=0.89) was applied.

For the catalysts of the Example and the Comparative Examples, the following physical properties were measured, and the results of the measurement are shown in Table 1 below.

(1) Electrical conductivity (S/cm): It was measured using a measurement instrument (manufactured by HanTech, Korea; product name: Company's manufactured instrument (powder resistivity measurement system: insulation resistance tester).

(2) BET specific surface area ($m^2/g$): It was measured using a measurement instrument (manufactured by Micromeritics, product name: ASAP2420).

(3) Evaluation of electrochemical surface area (ECSA, $m^2/g$), oxygen reduction reaction (ORR) and catalytic activity ($mA/mg_{pt}$): 0.02 g of the catalyst of each of the Example and the Comparative Examples was dispersed in 10 g of 2-propanol to obtain a dispersion of each catalyst. 15 μL of the dispersion was dropped into a glassy carbon electrode by a micropipette and dried at room temperature, and then 15 μL of a 5 wt % Nafion aqueous solution was dropped into the electrode having the catalyst dropped thereinto and was dried, thereby preparing a working electrode.

The working electrode prepared by the above method was mounted on a rotating disk electrode (RDE) device. As a counter electrode, a platinum wire was prepared, and as a reference electrode, Ag/AgCl (KClsat) was prepared.

The three-phase electrode prepared as described above was placed in a 0.1M $HClO_4$ electrolyte solution and bubbled with nitrogen for 30 minutes to remove residual oxygen from the electrolyte solution. The current density values were measured by performing cyclic voltammetric analysis in the range of 0.01 to 1.2 V (vs. NHE) using a constant-potential electrolysis system and a constant-current electrolysis system (potentiostat/galvanostat).

Thereafter, oxygen in the electrolyte solution was dissolved to saturation. Then, while the glassy carbon electrode was rotated, the oxygen reduction reaction (ORR) current density was recorded in a negative direction from an open circuit voltage (OCV) to a potential (0.5 to 1.2 V vs. NHE) where a material limiting current occurs.

TABLE 1

|  | Example | Comparative Example 1 | Comparative Example 2 | Comparative Example 3 |
| --- | --- | --- | --- | --- |
| Electrical conductivity (S/cm) | 31.3 | 26.7 | — | 7.2 |
| Specific surface area ($m^2/g$) | 49.7 | 250 | 54.7 | 41.5 |
| ECSA ($m^2/g$) | 41.9 | 40.7 | 23.2 | 31.8 |
| Catalytic activity ($mA/mg_{pt}$) | 40 | 2.4 | 7.0 | 3.2 |

Referring to the results in Table 1 above, it could be seen that the Example of the present disclosure showed excellent electrical conductivity, electrochemical surface area and catalytic activity compared to Comparative Example 1, in which the Pt/C catalyst was used, and Comparative Examples 2 and 3 in which the titanium oxynitride different from that of the present disclosure was used.

Figure 2:
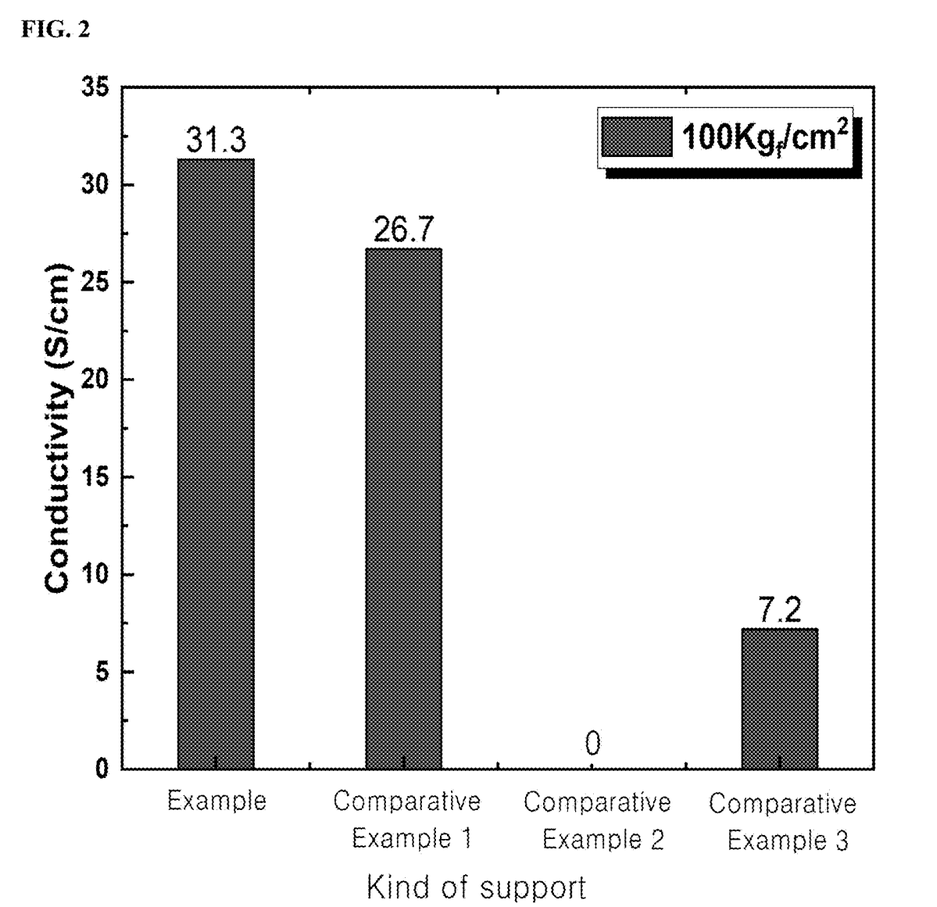
FIG. 2 is a graph showing the electrical conductivities of an Example and Comparative Examples 1 to 3.

FIG. 2 is a graph showing the electrical conductivities of the Example and Comparative Examples 1 to 3. Referring to FIG. 2, it could be seen that, at a pressure of 100 $kg/cm^2$, among the Example and Comparative Examples 1 to 3, the Example, in which the amount of Ti—O—N bonds on the surface and the inside of the catalyst was the largest, showed a 1.2-fold higher electrical conductivity compared to carbon used as a conventional support. In addition, it could be seen that Comparative Example 2, in which nitride was formed only on the surface of the support, had no electrical conductivity, and Comparative Example 3, which had a large amount of TiN bonds due to formation of a large amount of nitride, showed lower electrical conductivity than the Example.

Figure 3:
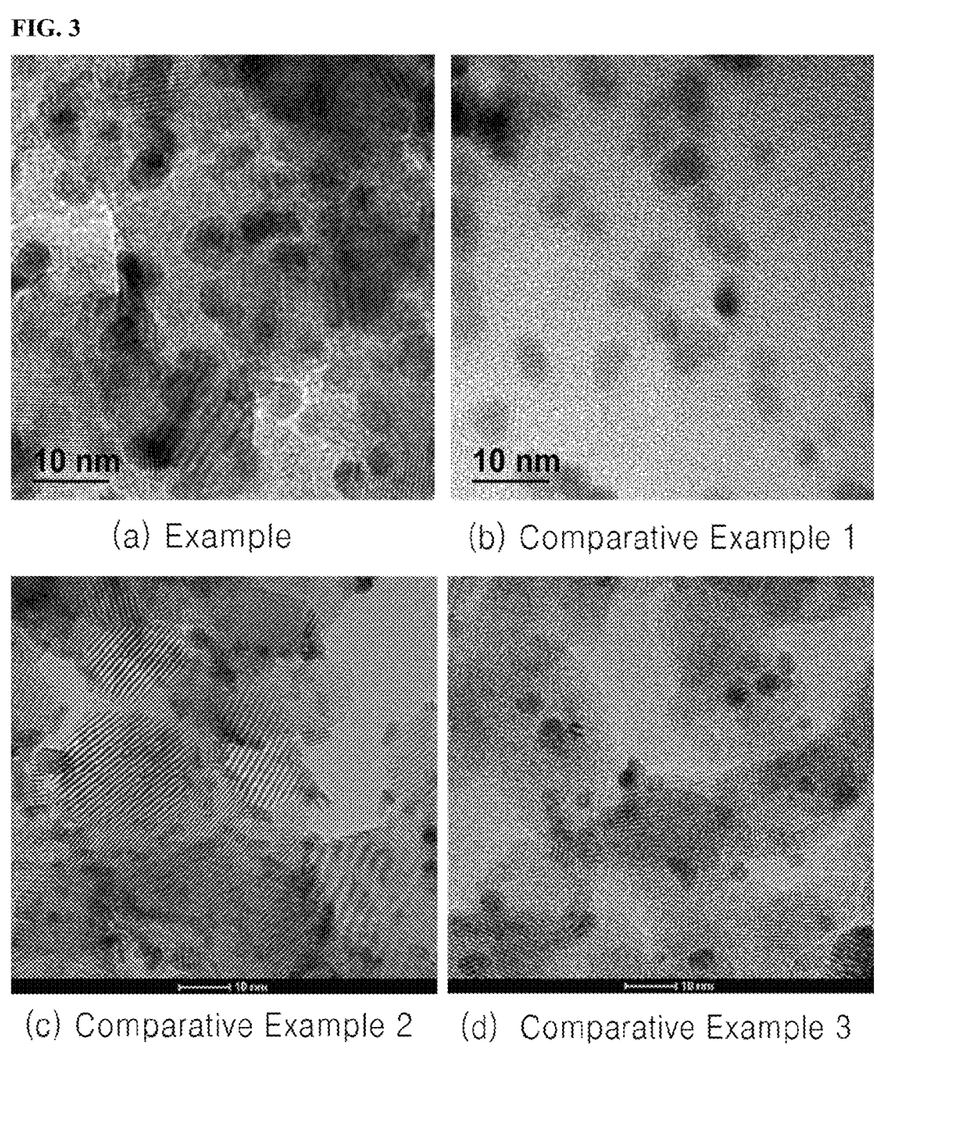
FIG. 3 depicts transmission electron microscope (TEM) photographs of the fuel cell catalysts of the Example and Comparative Examples 1 to 3.

FIG. 3 depicts transmission electron microscope (TEM) photographs of the fuel cell catalysts of the Example and Comparative Examples 1 to 3. Referring to FIG. 3, it could be seen that, in the Example, the active material having a uniform size of 2 to 5 nm was supported on the surface of the support including the titanium oxynitride.

Figure 4:
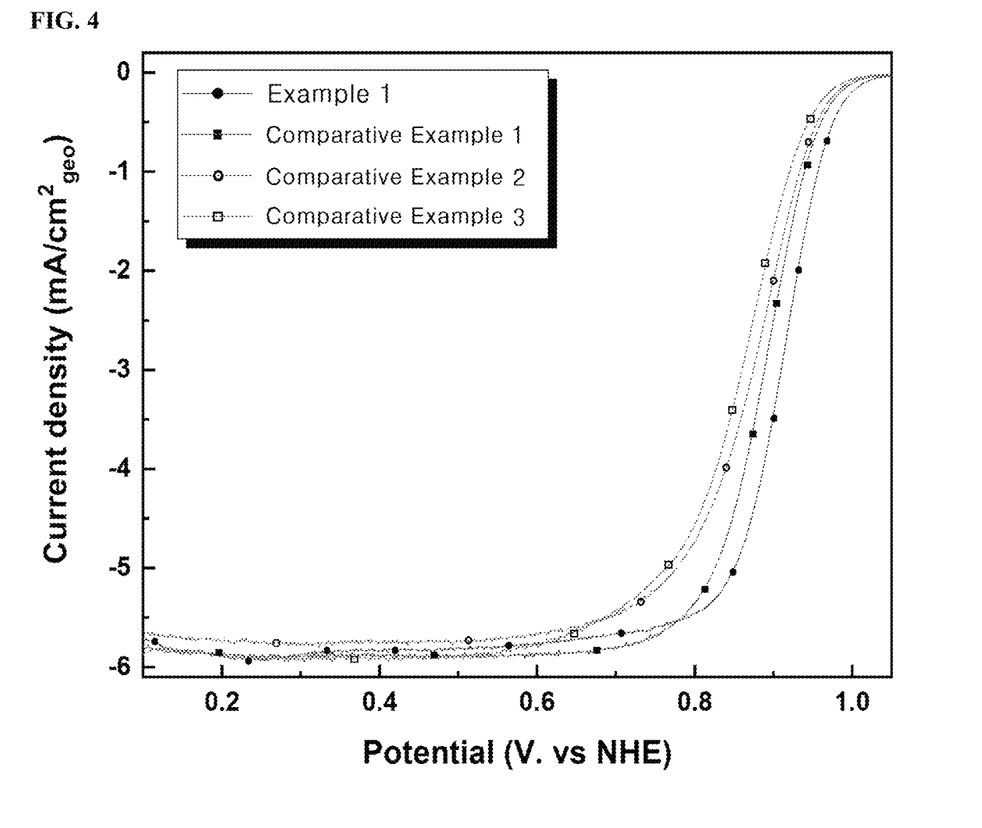
FIG. 4 is a graph showing the results of evaluating the oxygen reduction reactions of the Example and Comparative Examples 1 to 3.

FIG. 4 is a graph showing the results of evaluating the oxygen reduction reactions of the Example and Comparative Examples 1 to 3. Referring to FIG. 4, it could be seen that, at a voltage of 0.9 V, the Example showed a higher current density value than the Comparative Examples, indicating that the activity of the catalyst supported on the support in the Example was higher than those in the Comparative Examples.

Simple modifications or variations of the present disclosure may be easily carried out by those skilled in the art, and all such modifications or variations can be considered included in the scope of the present disclosure.

What is claimed is:

1. A fuel cell catalyst comprising:
a support comprising a titanium oxynitride represented by the following Formula 1; and an active material supported on the support:

$$TiO_{1-y}N_y \quad \text{[Formula 1]}$$

wherein $0.05<y<0.9$, wherein the titanium oxynitride of Formula 1 is comprised in an amount of 2.4 to 20 wt % based on the total weight of the support.

2. The fuel cell catalyst of claim 1, wherein the titanium oxynitride of Formula 1 is comprised in an amount of 2.5 to 19 wt % based on the total weight of the support.

3. The fuel cell catalyst of claim 1, comprising 100 parts by weight of the support and 10 to 60 parts by weight of the active material.

4. The fuel cell catalyst of claim 1, wherein the active material has an average size of 2 to 10 nm.

5. The fuel cell catalyst of claim 1, wherein the support has a BET specific surface area of 20 to 50 m2/g and an electrical conductivity of 20 to 40 S/cm.

6. The fuel cell catalyst of claim 1, wherein the support has an average pore size of 50 to 80 nm.

7. The fuel cell catalyst of claim 1, wherein the support is prepared by a method comprising steps of:
preparing an intermediate by heat-treating titanium dioxide (TiO2) to a temperature of 400 to 900° C. while introducing a nitrogen-containing gas thereto; and
cooling the intermediate.

8. The fuel cell catalyst of claim 7, wherein the heat-treating is performed by heating to a temperature of 400 to 900° C. at a heating rate of 1 to 15° C/second.

9. The fuel cell catalyst of claim 1, wherein the active material includes one or more precious metals selected from among platinum (Pt), palladium (Pd), iridium (Ir) and ruthenium (Ru).

10. The fuel cell catalyst of claim 9, wherein the active material further comprises one or more transition metals selected from among copper (Cu), cobalt (Co), nickel (Ni) and iron (Fe).

11. A fuel cell electrode comprising the fuel cell catalyst of claim 1.

12. A membrane-electrode assembly comprising: a cathode; an anode; and an electrolyte membrane interposed between the cathode and the anode, wherein one or more of the cathode and the anode comprise the fuel cell catalyst of claim 1.

13. A fuel cell comprising the fuel cell catalyst of claim 1.

* * * * *